US012752502B2

(12) United States Patent
Witzel et al.

(10) Patent No.: US 12,752,502 B2
(45) Date of Patent: Oct. 6, 2026

(54) METHODS OF REPAIRING A CONTOURED COMPOSITE STRUCTURE AND MAKING A REPAIR TOOL

(71) Applicant: The Boeing Company, Arlington, VA (US)

(72) Inventors: Kyle A. Witzel, Brier, WA (US); Daniel L. Lichtenstein, Lake Forest Park, WA (US); Larry D. Ridgeway, Snohomish, WA (US); Pradeep Krishnaswamy, Redmond, WA (US)

(73) Assignee: The Boeing Company, Arlington, VA (US)

( * ) Notice: Subject to any disclaimer, the term of this patent is extended or adjusted under 35 U.S.C. 154(b) by 308 days.

(21) Appl. No.: 18/511,236

(22) Filed: Nov. 16, 2023

(65) Prior Publication Data

US 2025/0162269 A1 May 22, 2025

(51) Int. Cl.
*B29C 73/12* (2006.01)
*B29L 31/30* (2006.01)

(52) U.S. Cl.
CPC ....... *B29C 73/12* (2013.01); *B29L 2031/3076* (2013.01)

(58) Field of Classification Search
None
See application file for complete search history.

(56) References Cited

U.S. PATENT DOCUMENTS

| | | | | |
|---|---|---|---|---|
| 9,403,328 | B1 | 8/2016 | Hafenrichter | |
| 2018/0036973 | A1 | 2/2018 | Dew | |
| 2018/0264759 | A1* | 9/2018 | Garhart | B64F 5/00 |
| 2019/0016107 | A1* | 1/2019 | Bertrand | B32B 37/12 |
| 2020/0262160 | A1 | 8/2020 | Register | |

FOREIGN PATENT DOCUMENTS

| | | | | |
|---|---|---|---|---|
| CA | 3016719 | A1 * | 4/2019 | B29C 65/48 |

OTHER PUBLICATIONS

Extended European Search Report for EP Patent Application No. 24202166.5 dated Apr. 8, 2025.

* cited by examiner

*Primary Examiner* — Barbara J Musser
(74) *Attorney, Agent, or Firm* — Massey Bean & Lewis

(57) ABSTRACT

Disclosed herein is a method of repairing a contoured composite structure. The method includes applying a first facesheet, a core layer, and a second facesheet onto a contoured composite structure to form a repair tool. The method further includes removing the repair tool from the contoured surface of the contoured composite structure. After removing the repair tool from the contoured surface of the contoured composite structure, the method includes replacing a structural abnormality of a contoured composite structure with an uncured repair structure. The method also includes applying the repair tool onto the contoured composite structure such that the repair tool overlays the uncured repair structure. The method additionally includes curing the uncured repair structure when the repair tool is applied onto the contoured composite structure over the uncured repair structure.

20 Claims, 10 Drawing Sheets

METHODS OF REPAIRING A CONTOURED COMPOSITE STRUCTURE AND MAKING A REPAIR TOOL

FIELD

This disclosure relates generally to composite structures, and more particularly to repairing composite structures using a repair tool.

BACKGROUND

Many structures are made of fiber-reinforced polymers because of their high strength and low weight. However, repairing damage to fiber-reinforced polymer structures can be complicated, time-intensive, and expensive. Although some techniques, such as scarf repair techniques, have been designed specifically to repair fiber-reinforced polymer structures, such techniques still suffer from several shortcomings. For example, some conventional scarf repairs to fiber-reinforced polymer structures result in warping of the structures, at least partially due to the pressure and heat associated with the repairs. Accordingly, maintaining the contour of a contoured structure made of a fiber-reinforced polymer, during a repair of the structure, can be difficult.

SUMMARY

The subject matter of the present application has been developed in response to the present state of the art, and in particular, in response to the shortcomings of composite structure repair that have not yet been fully solved by currently available techniques. Accordingly, the subject matter of the present application has been developed to provide a method of repairing a composite structure that overcomes at least some of the above-discussed shortcomings of prior art techniques.

The following portion of this paragraph delineates example 1 of the subject matter, disclosed herein. According to example 1, a method of repairing a contoured composite structure made of fiber-reinforced polymer plies is disclosed. The method includes applying a first facesheet, made of a first cured material, onto a contoured surface of the contoured composite structure such that the first facesheet overlays a structural abnormality of the contoured composite structure and conforms to the shape of the contoured surface. The method also includes adhering a core layer to the first facesheet such that the core layer overlays the structural abnormality of the contoured composite structure and conforms to the shape of the contoured surface. The method additionally includes adhering a second facesheet, made of a second cured material, to the core layer such that the core layer is sandwiched between the first facesheet and the second facesheet, the second facesheet overlays the structural abnormality of the contoured composite structure, and the second facesheet conforms to the shape of the contoured surface. The first facesheet, the core layer, and the second facesheet form a repair tool. The method further includes removing the repair tool from the contoured surface of the contoured composite structure. After removing the repair tool from the contoured surface of the contoured composite structure, the method includes replacing the structural abnormality of the contoured composite structure with an uncured repair structure. The method also includes reapplying the repair tool onto the contoured surface such that the repair tool overlays the uncured repair structure. When the repair tool is reapplied onto the contoured surface over the uncured repair structure, the method additionally includes curing the uncured repair structure.

The following portion of this paragraph delineates example 2 of the subject matter, disclosed herein. According to example 2, which encompasses example 1, above, adhering the core layer to the first facesheet includes applying a first adhesive between the first facesheet and the core layer, and at least partially curing the first adhesive.

The following portion of this paragraph delineates example 3 of the subject matter, disclosed herein. According to example 3, which encompasses example 2, above, adhering the second facesheet to the core layer includes applying a second adhesive between the second facesheet and the core layer, and at least partially curing the second adhesive.

The following portion of this paragraph delineates example 4 of the subject matter, disclosed herein. According to example 4, which encompasses example 3, above, the first adhesive and the second adhesive are at least partially cured at a first cure temperature, the uncured repair structure is cured at a second cure temperature, and the second cure temperature is greater than the first cure temperature.

The following portion of this paragraph delineates example 5 of the subject matter, disclosed herein. According to example 5, which encompasses example 4, above, the second cure temperature is at least 1.8 times higher than the first cure temperature.

The following portion of this paragraph delineates example 6 of the subject matter, disclosed herein. According to example 6, which encompasses any one of examples 4 or 5, above, the first adhesive and the second adhesive are partially cured at the first cure temperature. The method further includes, after removing the repair tool from the contoured surface and before reapplying the repair tool onto the contoured surface, fully curing the first adhesive and the second adhesive at a third cure temperature greater than the first cure temperature.

The following portion of this paragraph delineates example 7 of the subject matter, disclosed herein. According to example 7, which encompasses any one of examples 1-6, above, each one of the first facesheet and the second facesheet includes no more than two plies of the first cured material and the second cured material, respectively.

The following portion of this paragraph delineates example 8 of the subject matter, disclosed herein. According to example 8, which encompasses any one of examples 1-7, above, the method further includes, before applying the first facesheet onto the contoured surface, applying a first stick-resistant sheet onto the contoured surface such that the first stick-resistant sheet is interposed between the first facesheet and the contoured surface. The method also includes removing the first stick-resistant sheet from the contoured surface after removing the repair tool from the contoured surface. The method additionally includes, before reapplying the repair tool onto the contoured surface, applying a second stick-resistant sheet onto the contoured surface such that the second stick-resistant sheet is interposed between the repair tool and the contoured surface.

The following portion of this paragraph delineates example 9 of the subject matter, disclosed herein. According to example 9, which encompasses any one of examples 1-8, above, curing the uncured repair structure includes applying pressure to the repair tool and the uncured repair structure and, when applying the pressure, heating the uncured repair structure.

The following portion of this paragraph delineates example 10 of the subject matter, disclosed herein. According to example 10, a method of repairing an abnormal contoured composite structure made of fiber-reinforced polymer plies is disclosed. The method includes applying a first facesheet, made of a first cured material, onto a normal contoured surface of a normal contoured composite structure such that the first facesheet overlays and conforms to the shape of the normal contoured surface. The shape of the normal contoured surface matches the shape of an abnormal contoured surface of the abnormal contoured composite structure. A structural abnormality of the abnormal contoured composite structure is formed in or under the abnormal contoured surface. The method also includes adhering a core layer to the first facesheet such that the core layer overlays the normal contoured surface of the normal contoured composite structure and conforms to the shape of the normal contoured surface. The method further includes adhering a second facesheet, made of a second cured material, to the core layer such that the core layer is sandwiched between the first facesheet and the second facesheet, the second facesheet overlays the normal contoured surface, and the second facesheet conforms to the shape of the normal contoured surface. The first facesheet, the core layer, and the second facesheet form a repair tool. The method also includes removing the repair tool from the normal contoured surface of the normal contoured composite structure and replacing the structural abnormality of the abnormal contoured composite structure with an uncured repair structure. The method additionally includes applying the repair tool onto the abnormal contoured surface of the abnormal contoured composite structure such that the repair tool overlays the uncured repair structure, and, when the repair tool is applied onto the abnormal contoured surface over the uncured repair structure, curing the uncured repair structure.

The following portion of this paragraph delineates example 11 of the subject matter, disclosed herein. According to example 11, which encompasses example 10, above, adhering the core layer to the first facesheet includes applying a first adhesive between the first facesheet and the core layer, and at least partially curing the first adhesive.

The following portion of this paragraph delineates example 12 of the subject matter, disclosed herein. According to example 12, which encompasses example 11, above, adhering the second facesheet to the core layer includes applying a second adhesive between the second facesheet and the core layer, and at least partially curing the second adhesive.

The following portion of this paragraph delineates example 13 of the subject matter, disclosed herein. According to example 13, which encompasses example 12, above, the first adhesive and the second adhesive are at least partially cured at a first cure temperature, the uncured repair structure is cured at a second cure temperature, and the second cure temperature is greater than the first cure temperature.

The following portion of this paragraph delineates example 14 of the subject matter, disclosed herein. According to example 14, which encompasses example 13, above, the second cure temperature is at least 1.8 times higher than the first cure temperature.

The following portion of this paragraph delineates example 15 of the subject matter, disclosed herein. According to example 15, which encompasses any one of examples 13-14, above, the first adhesive and the second adhesive are partially cured at the first cure temperature. The method further includes, after removing the repair tool from the normal contoured surface and before applying the repair tool onto the contoured surface of the contoured composite structure, fully curing the first adhesive and the second adhesive at a third cure temperature greater than the first cure temperature.

The following portion of this paragraph delineates example 16 of the subject matter, disclosed herein. According to example 16, which encompasses any one of examples 10-15, above, each one of the first facesheet and the second facesheet includes no more than two plies of the first cured material and the second cured material, respectively.

The following portion of this paragraph delineates example 17 of the subject matter, disclosed herein. According to example 17, which encompasses any one of examples 10-16, above, the method further includes, before applying the first facesheet onto the normal contoured surface, applying a first stick-resistant sheet onto the normal contoured surface such that the first stick-resistant sheet is interposed between the first facesheet and the normal contoured surface. The method also includes, before applying the repair tool onto the contoured surface of the contoured composite structure, applying a second stick-resistant sheet onto the contoured surface such that the second stick-resistant sheet is interposed between the repair tool and the contoured surface.

The following portion of this paragraph delineates example 18 of the subject matter, disclosed herein. According to example 18, which encompasses any one of examples 10-17, above, curing the uncured repair structure includes applying pressure to the repair tool and the uncured repair structure and, when applying the pressure, heating the uncured repair structure.

The following portion of this paragraph delineates example 19 of the subject matter, disclosed herein. According to example 19, a method of forming a repair tool for repairing an abnormal contoured composite structure made of fiber-reinforced polymer plies is disclosed. The method includes applying a first facesheet, made of a first cured material, onto one of: (1) an abnormal contoured surface of the abnormal contoured composite structure such that the first facesheet overlays a structural abnormality of the abnormal contoured composite structure and conforms to the shape of the abnormal contoured surface; or (2) a normal contoured surface of a normal contoured composite structure such that the first facesheet overlays and conforms to the shape of the normal contoured surface, wherein the shape of the normal contoured surface matches the shape of the abnormal contoured surface of the abnormal contoured composite structure. The structural abnormality of the abnormal contoured composite structure is formed in or under the abnormal contoured surface. The method also includes adhering a core layer to the first facesheet such that the core layer conforms to the shape of the first facesheet. The method additionally includes adhering a second facesheet, made of a second cured material, to the core layer such that the core layer is sandwiched between the first facesheet and the second facesheet, and the second facesheet conforms to the shape of the core layer. The method further includes removing the first facesheet, the core layer, and the second facesheet from either the abnormal contoured surface of the abnormal contoured composite structure or the normal contoured surface of the normal contoured composite structure.

The following portion of this paragraph delineates example 20 of the subject matter, disclosed herein. According to example 20, which encompasses example 19, above, adhering the core layer to the first facesheet includes applying a first adhesive between the first facesheet and the core layer and at least partially curing the first adhesive. Adhering the second facesheet to the core layer includes applying a second adhesive between the second facesheet and the core layer, and at least partially curing the second adhesive.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Several tooling techniques exist for the purpose of maintaining the contour of a fiber-reinforced polymer structure during the repair of the structure. Some tooling techniques include foam tooling, fiberglass tooling, aluminum tooling, and carbon tooling. Although certain conventional tooling techniques promote maintenance of the contour of a structure during a repair process, the techniques can be time consuming and require expensing repair tools. Additionally, some conventional tooling techniques requiring excess heating of the part being repaired, which can lead to warping of the part. Disclosed herein are examples of methods of repairing contoured composite structures with repair tools in a timely and inexpensive manner, and in a manner that promotes the integrity of the structures under repair. According to some examples, the methods disclosed herein utilize the contour of a structure under repair, or a matching structure, to form a repair tool having a strong sandwich-panel construction that is cured at a low curing temperature, and that is stiff enough to facilitate shallow and deep repairs using any of various repair techniques.

Figure 1:
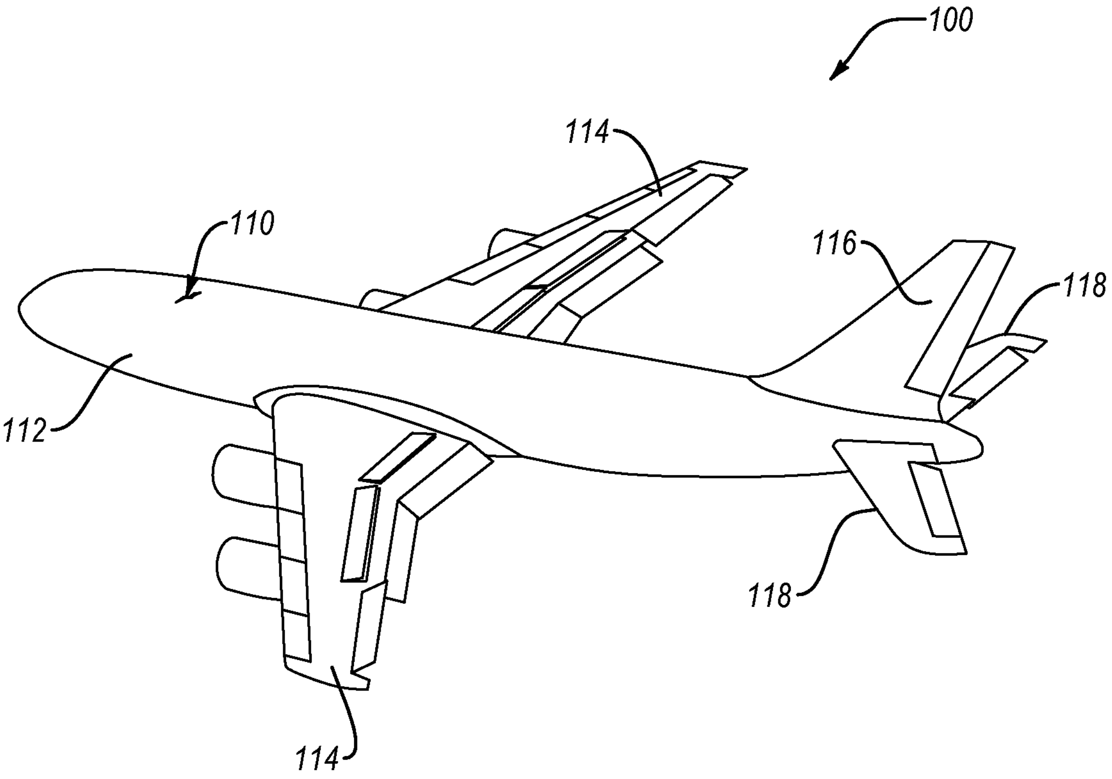
FIG. 1 is a perspective view of an aircraft with a structural abnormality, according to one or more examples of the present disclosure.

Referring to FIG. 1, one example of an aircraft 100 is shown. The aircraft 100 can be any of various types of aircraft, such as commercial aircraft used for the transportation of passengers, military aircraft for military operations, personal aircraft, fighter jets, and the like. Moreover, although an aircraft is depicted in the illustrated examples, in other embodiments, another structure, such as a vehicle (e.g., helicopter, boat, spacecraft, automobile, etc.) or non-mobile complex structure (e.g., building, bridge, machinery, etc.), having a composite structure, can be used instead of the aircraft 100.

The depicted aircraft 100 includes a body 112 (e.g., fuselage), a pair of wings 114 coupled to and extending from the body 112, a vertical stabilizer 116 coupled to the body 112, and a pair of horizontal stabilizers 118 coupled to the body 112 and/or the vertical stabilizer 116. As depicted, the aircraft 100 represents a passenger airplane. Any of various parts or components of the aircraft 100 can include a contoured composite structure 130 made of a fiber-reinforced polymer (see, e.g., FIG. 2). For example, the body 112 of the aircraft 100 can include a contoured composite structure 130 that forms a skin of the body 112 of the aircraft 100. According to another examples, the wings 114, the vertical stabilizer 116, and/or the horizontal stabilizers 118 can include a contoured composite structure 130. Alternatively, the contoured composite structure 130 can form part of a non-aircraft structure, such as those described above.

Figure 2:
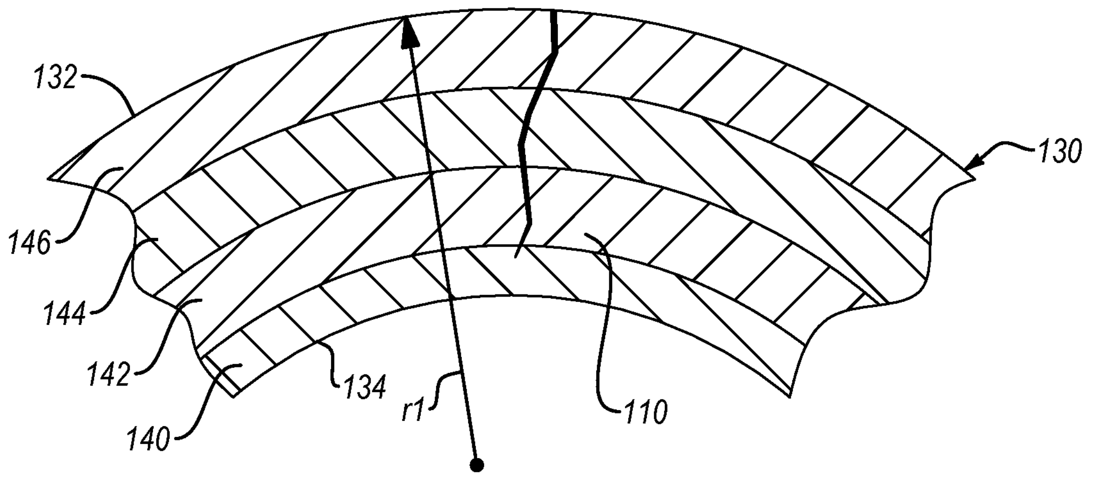
FIG. 2 is a cross-sectional side view of a contoured composite structure with a structural abnormality, according to one or more examples of the present disclosure.

Referring to FIG. 2, one example of a contoured composite structure 130 is shown. The contoured composite structure 130 includes a contoured surface 132, which, as used herein, is an outer, exterior, or exposed surface that is non-planar, non-flat, or curved. In some examples, the contoured composite structure 130 includes an interior surface 134, which is opposite the contoured surface 132, and can have a contour that matches or tracks that of the contoured surface 132 (e.g., is the same contour as the contoured surface 132, but inverted), or can have a contour that does not match or track the contour of the contoured surface 132. Accordingly, as used herein, the contoured composite structure 130 is any structure made of a fiber-reinforced polymer that has a contoured surface. The contour or curvature of the contoured surface 132 can be a simple contour, such as shown, or a complex contour, such as one with one or more one inflection points. In the illustrated example, the contour of the contoured surface 132 can be defined by a radius of curvature r1 of the contoured surface 132. However, in other examples, such as for complex contours, the contour of the contoured surface 132 can be defined by multiple radii of curvature or by some other means.

The contoured composite structure 130 can be made of one or more fiber-reinforced polymer plies. In the illustrated example of FIG. 2, the contoured composite structure 130 includes multiple fiber-reinforced polymer plies. For example, the contoured composite structure 130 includes a first fiber-reinforced polymer ply 140, a second fiber-reinforced polymer ply 142, a third fiber-reinforced polymer ply 144, and a fourth fiber-reinforced polymer ply 146. Although the contoured composite structure 130 of the illustrated example has four fiber-reinforced polymer plies, in other examples, the contoured composite structure 130 has fewer or more than four plies.

The fiber-reinforced polymer plies of the contoured composite structure 130 are laid up in a stacked formation. According to some examples, each fiber-reinforced polymer ply of the contoured composite structure 130 includes unidirectional fibers embedded within a polymer resin, a fabric embedded within a polymer resin, or both unidirectional fibers and a fabric embedded within a polymer resin (e.g., hybrid laminates).

When each fiber-reinforced polymer ply includes unidirectional fibers embedded within a polymer resin, the unidirectional fibers can be any of various fibers, such as carbon fibers, glass fibers, and the like. Each fiber of the unidirectional fibers is between about 5-20 micrometers in diameter and has a length-to-diameter aspect ratio that, while length dependent, is conventionally greater than 10,000:1. In some implementations, each unidirectional fiber has a diameter at least equal to or greater than 1 micrometer. Moreover, each fiber of the unidirectional fibers has a planar or sheet-like atomic structure. The polymer resin can be any of various thermoset polymer resins or epoxies known in the art. The unidirectional fibers are embedded in the polymer resin when the polymer resin is in a pre-cured state. In the pre-cured state, the polymer resin is relatively soft, pliable, and flexible. As the polymer resin is cured, by heating the polymer resin to a cure temperature of the polymer resin, the polymer resin becomes hard and stiff. After heating the polymer resin and well before reaching the cure temperature, a viscosity of the polymer resin decreases and the polymer resin becomes flowable. For a given fiber-reinforced polymer ply, the fibers are unidirectional because each fiber is lengthwise parallel to a given direction. The direction of the unidirectional fibers of a fiber-reinforced polymer ply is dependent on the orientation of the fiber-reinforced polymer ply in the contoured composite structure 130. To promote strength in multiple directions, the fiber-reinforced polymer plies of the contoured composite structure 130 are oriented relative to each other such that the unidirectional fibers of one fiber-reinforced polymer ply are parallel to a direction that is different than the unidirectional fibers of any directly adjacent fiber-reinforced polymer ply.

When each fiber-reinforced polymer ply includes a fabric embedded within a polymer resin, the fabric can be a woven fabric or the fabric can form a fabric weave. The fabric weave can be any of various types of weaves, such as plain weave, satin weave, tri-axial braided weave, 8-harness weave, twill weave, basket weave, three-dimensional knitted weave, and the like. The fabric weave is embedded in the polymer resin when the polymer resin is in a pre-cured state. As mentioned above, in the pre-cured state, the polymer resin is relatively soft, pliable, and flexible. As the polymer resin is cured, by heating the polymer resin to a cure temperature of the polymer resin, the polymer resin becomes hard and stiff.

The contoured composite structure 130 is in a final state (e.g., a finished product). In some examples, the contoured composite structure 130 is a finished product that has been in use for an intended purpose, such as an aircraft that has experienced one or more flights. Accordingly, the fiber-reinforced polymer plies of the contoured composite structure 130 are in a cured state (e.g., the polymer undergoes an irreversible curing or cross-linking process that prevents resoftening, reapplication, or rehardening of the polymer). Prior to curing the fiber-reinforced polymer plies together, the plies are stacked together in desired orientations relative to each other to produce desired fiber angles. After the fiber-reinforced polymer plies are in the desired orientations, the plies are heated to the curing temperature of the plies to cure the plies and effectively bond the plies together. According to some examples, an outer surface of an outermost one of the multiple plies of the contoured composite structure 130 defines the contoured surface 132. However, in some implementations, one or more additional plies or layers, such as a paint layer, a sealant layer, a protective coating, etc., are deposited onto the plies and form the contoured surface 132 of the contoured composite structure 130.

The contoured composite structure 130 may have a structural abnormality 110, such as a crack, delamination, impact damage, etc. In the illustrated example, the structural abnormality 110 is represented as a crack. The structural abnormality 110 can be the result of a defect created during the manufacturing or assembly of the contoured composite structure 130, or it can be developed during use of the contoured composite structure 130. In some situations, as shown, the structural abnormality 110 is formed in the contoured surface 132 and extends a depth into the contoured composite structure 130. However, in other situations, such as is associated with a delamination, the structural abnormality 110 is not formed in the contoured surface 132 and is located below the contoured surface 132 at some depth within the contoured composite structure 130.

To eliminate the structural abnormality 110 and ensure safe and continued use of the contoured composite structure 130, the structural abnormality 110 can be removed using any of various removal methods, such as a scarf repair method. Generally, most removal methods result in a repair structure (see, e.g., uncured repair structure 170 of FIG. 7) effectively replacing the structural abnormality 110. More specifically, a portion of the contoured composite structure 130, containing the structural abnormality 110, is removed and replaced by the repair structure. The repair structure can be a laminated structure, with multiple plies, or a non-laminated structure. Desirably, the repair structure is configured to provide more strength and resistance to further damage than the portion of the contoured composite structure 130 containing the structural abnormality 110. The repair structure can extend entirely through a thickness of the contoured composite structure 130, as shown, or extend only partially through the thickness. During some processes of replacing the structural abnormality 110 with a repair structure, the repair structure must undergo a curing process that requires heat and/or pressure to be applied to the repair structure. For example, the repair structure may be heated to a curing temperature while under pressure. The heat and pressure applied to the repair structure also heats and applies pressure to the contoured composite structure 130. Without structurally supporting the contoured composite structure 130 during the curing of the repair structure, the contoured composite structure 130 can be warped and the initial contour of the contoured composite structure 130 can be changed.

Figure 3:
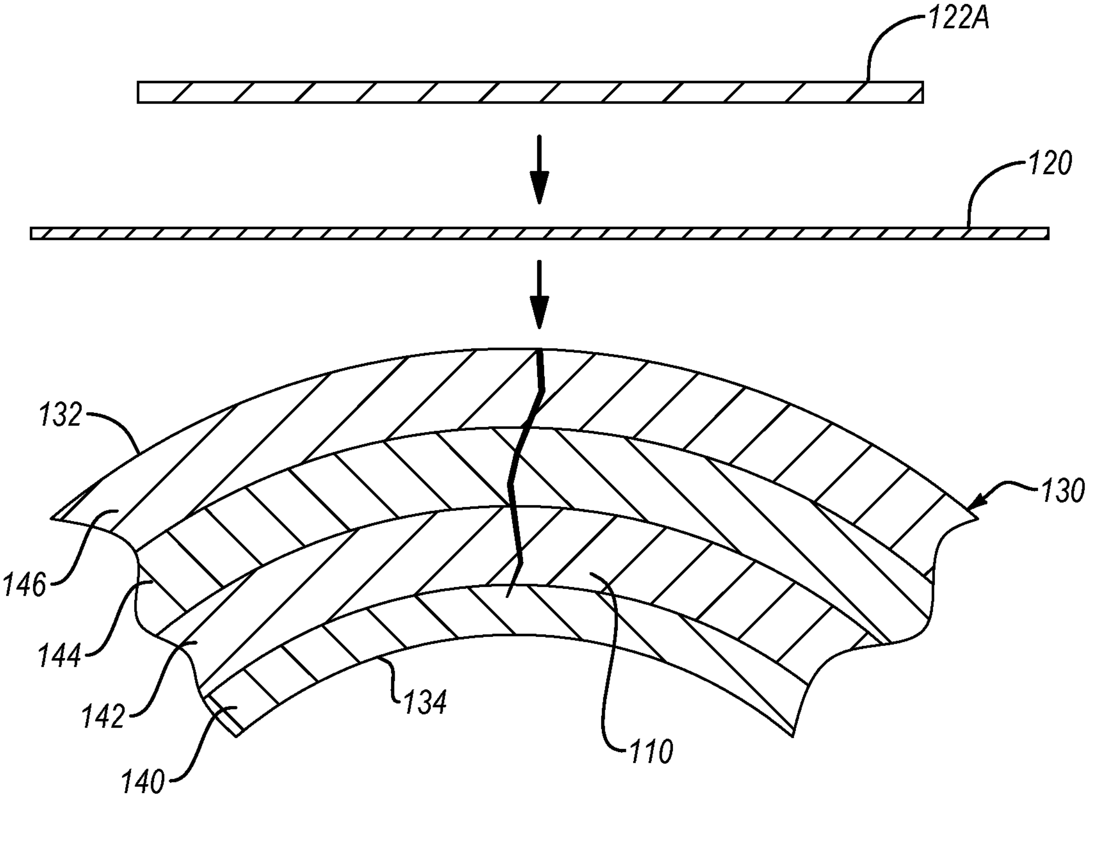
FIG. 3 is a cross-sectional side view of the contoured composite structure of FIG. 2, shown with a first facesheet and a first stick-resistant sheet being applied onto a contoured surface of the contoured composite structure, according to one or more examples of the present disclosure.
Figure 12:
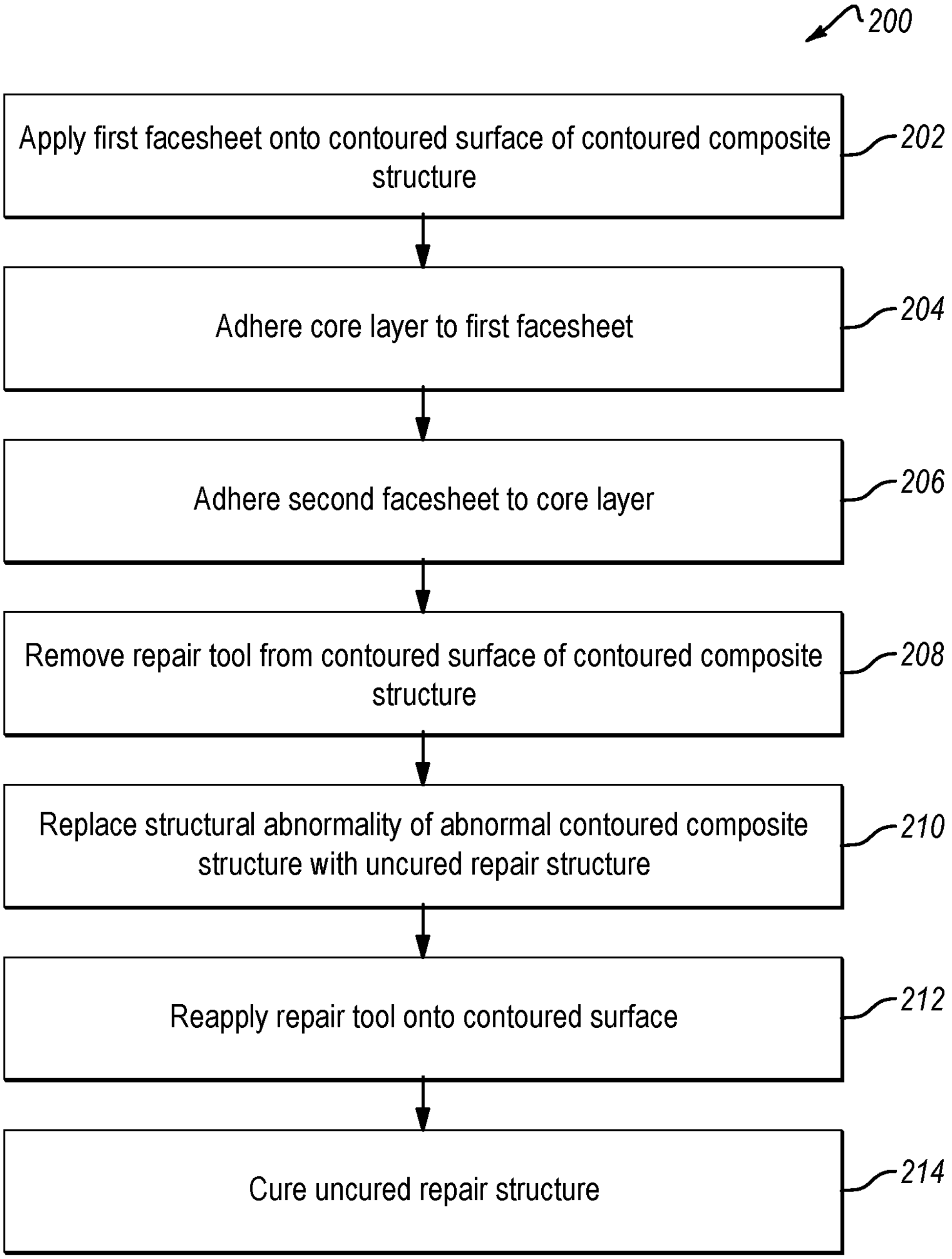
FIG. 12 is a schematic flow chart of a first method of repairing a contoured composite structure, according to one or more examples of the present disclosure.

According to FIG. 12, one example of a method 200 of repairing the contoured composite structure 130 includes the formation of a repair tool 160 that helps to support the contoured composite structure 130, thus preserving the initial contour of the contoured composite structure 130, when the repair structure is cured. Referring to FIGS. 3 and 12, the method 200 includes (block 202) applying a first facesheet 122A onto the contoured surface 132 of the contoured composite structure 130 having the structural abnormality 110. The first facesheet 122A is applied onto a portion of the contoured surface 132 associated with the portion of the contoured composite structure 130 that contains the structural abnormality 110. In this manner, the first facesheet 122A overlays or effectively bridges over the structural abnormality 110 of the contoured composite structure 130. Even if the structural abnormality 110 is not formed in the contoured surface 132 and is located under the contoured surface 132, the first facesheet 122A overlays or bridges over the structural abnormality 110 because the structural abnormality 110 is located underneath the first facesheet 122A.

Before applying the first facesheet 122A onto the contoured surface 132, the first facesheet 122A has a shape that is different than that of the contoured surface 132. In some examples, as shown, the first facesheet 122A, prior to application onto the contoured surface 132, is flat or planar. As the first facesheet 122A is applied onto the contoured surface 132, the first facesheet 122A conforms to the shape (e.g., contour or curvature) of the contoured surface 132. That is, the first facesheet 122A flexes, deforms, or is reshaped as it is applied onto the contoured surface 132, such that it takes the same shape as the contoured surface 132. Accordingly, the first facesheet 122A is less rigid or more pliable than the contoured surface 132. In certain examples, the first facesheet 122A is semi-rigid or pliable enough to be reshaped into the shape of the contoured surface 132 with only manually applied pressure. However, the first facesheet 122A is made of a cured material, such as a cured fiber-reinforced polymer material or a cured non-fibrous polymer material, such that the cured material of the first facesheet 122A has undergone an irreversible curing or cross-linking process. Despite the cured material being cured, the flexibility of the first facesheet 122A is enabled in view of the relative thinness of the first facesheet 122A. According to one example, the first facesheet 122A is made of only two stacked plies of fiber-reinforced polymeric material. For example, the first facesheet 122A can be made of a 2-ply carbon fiber sheet or fiberglass sheet. In some examples, each one of the facesheets disclosed herein can have a thickness between, and inclusive of, 0.014 inches and 0.022 inches (e.g., around 0.017 inches). Accordingly, for facesheets having two plies, each ply is equal to one-half of the thickness of the facesheet.

To promote the release of the first facesheet 122A from the contoured surface 132 after the repair tool 160 is formed on the contoured surface 132, a first stick-resistant sheet 120 can be applied directly onto the contoured surface 132 before applying the first facesheet 122A onto the contoured surface 132. In this manner, the first stick-resistant sheet 120 is interposed between the first facesheet 122A and the contoured surface 132. Accordingly, as used herein, the first facesheet 122A, or another layer or sheet, is considered to be applied onto the contoured surface 132 even if an intervening layer, such as the first stick-resistant sheet 120, is positioned therebetween. The first stick-resistant sheet 120 can be any of various flexible sheets that promotes a low-stick interface between the contoured surface 132 and the first facesheet 122A. In one example, the first stick-resistant sheet 120 is a sheet of fluorinated ethylene propylene, another copolymer of tetrafluoroethylene and hexafluoropropylene, or any of various other low stick materials. The flexibility of the first stick-resistant sheet 120 enables the first stick-resistant sheet 120 to conform to the shape of the contoured surface 132.

Figure 4:
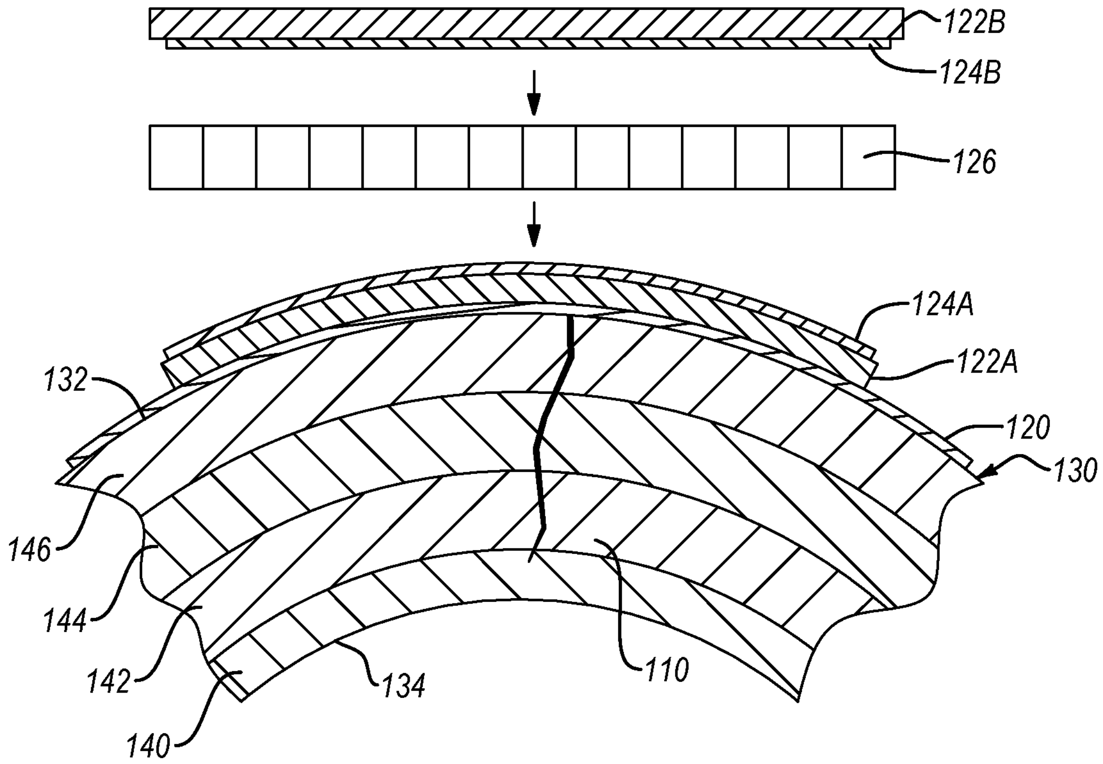
FIG. 4 is a cross-sectional side view of the contoured composite structure of FIG. 3, shown with a core layer being applied onto the first facesheet and a second facesheet being applied onto the core layer, according to one or more examples of the present disclosure.

After the first facesheet 122A is applied onto the contoured composite structure 130 at block 202, and referring to FIGS. 4 and 12, the method 200 includes (block 204) adhering a core layer 126 to the first facesheet 122A such that, like the first facesheet 122A, the core layer 126 overlays the structural abnormality 110 of the contoured composite structure 130. In some examples, the core layer 126 overlays an area that is the same as or smaller than that of the first facesheet 122A. Therefore, in certain examples, the first facesheet 122A can overhang the core layer 126. The core layer 126 is semi-rigid or pliable enough to be reshaped into the shape of the contoured surface 132 so that the core layer 126 conforms to the shape of the contoured surface 132. In some examples, the core layer 126 is shaped to match the shape of the contoured surface 132 with only manually applied pressure. Before applying the core layer 126 onto the first facesheet 122A, the core layer 126 has a shape that is different than that of the contoured surface 132. In some examples, as shown, the core layer 126, prior to application onto the first facesheet 122A, is flat or planar. As the core layer 126 is applied onto the first facesheet 122A, the core layer 126 conforms to the shape (e.g., contour or curvature) of the first facesheet 122A, and thus conforms to the shape of the contoured surface 132.

Figure 10:
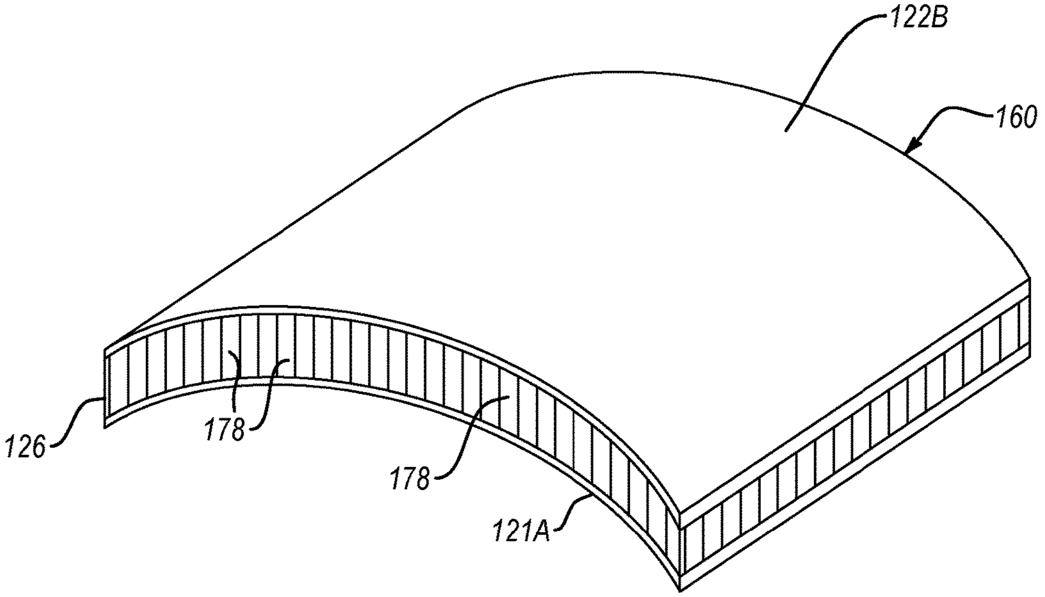
FIG. 10 is a perspective view of a repair tool, according to one or more examples of the present disclosure.

The core layer 126 is configured to support the first facesheet 122A relative to a second facesheet 122B, and to increase the flexural stiffness of the repair tool 160 with little weight gain. The core layer 126 can be a sheet of any of various types of lightweight materials and structures. For example, the core layer 126 can be a honeycomb core having an array of honeycomb-shaped cells 178 made of any of various materials, such as metal (e.g., aluminum), non-metal (e.g., fibrous paper materials) (see, e.g., FIG. 10). In other examples, the core layer 126 can be a cellular polymer core (e.g., foam) or other type of core.

After the core layer 126 is applied onto the contoured composite structure 130 at block 204, and again referring to FIGS. 4 and 12, the method 200 includes (block 206) adhering a second facesheet 122B to the core layer 126 such that the core layer 126 is sandwiched between the first facesheet 122A and the second facesheet 122B. The second facesheet 122B is adhered to the core layer 126 so that, like the first facesheet 122A and the core layer 126, the second facesheet 122B overlays the structural abnormality 110 of the contoured composite structure 130. In some examples, the second facesheet 122B overlays an area that is the same as that of the first facesheet 122A. Therefore, in certain examples, the second facesheet 122B can overhang the core layer 126.

Before applying the second facesheet 122B onto the core layer 126, the second facesheet 122B has a shape that is different than that of the contoured surface 132. In some examples, as shown, the second facesheet 122B, prior to application onto the core layer 126, is flat or planar. As the second facesheet 122B is applied onto the core layer 126, the second facesheet 122B conforms to the shape (e.g., contour or curvature) of the core layer 126, and thus conforms to the shape of the contoured surface 132. That is, the second facesheet 122B flexes, deforms, or is reshaped as it is applied onto the core layer 126, such that it takes the same shape as the core layer 126 and the contoured surface 132. Accordingly, the second facesheet 122B is less rigid or more pliable than the contoured surface 132. In certain examples, the second facesheet 122B is semi-rigid or pliable enough to be reshaped into the shape of the contoured surface 132 with only manually applied pressure. Like the first facesheet 122A, the second facesheet 122B is made of a cured material, such as such as a cured fiber-reinforced polymer material or a cured non-fibrous polymer material, such that the cured material of the second facesheet 122B has undergone an irreversible curing or cross-linking process. Despite the cured material being cured, the flexibility of the second facesheet 122B is enabled in view of the relative thinness of the second facesheet 122B. According to some examples, the second facesheet 122B has the same configuration of plies as and is made of the same material as the first facesheet 122A. However, in other examples, the second facesheet 122B has a different ply configuration or is made of a different material than the first facesheet 122A.

The core layer 126, the first facesheet 122A, being adhered to the core layer 126, and the second facesheet 122B, being adhered to the core layer 126, collectively form the repair tool 160. In this manner, according to the method 200, the repair tool 160 is formed on the contoured composite structure 130 having the structural abnormality 110. Forming the repair tool 160 on the contoured composite structure 130 helps to ensure the contour of the repair tool 160 (i.e., a contour of the structure interface surface 162 or innermost surface of the repair tool 160 (see, e.g., FIG. 6)) matches the contour of the contoured surface 132 of the contoured composite structure 130, so that as the contoured composite structure 130 is being repaired the contour of the contoured surface 132 is prevented from changing due to the engagement with the repair tool 160. In some examples, each one of the first facesheet 122A and the second facesheet 122B, as well as the repair tool 160 formed of the first facesheet 122A and the second facesheet 122B, can have an area of at least 3,000 $in^2$ (e.g., at least 60 inches by at least 50 inches). However, in other examples, each one of the first facesheet 122A and the second facesheet 122B can have an area less than 3,000 $in^2$.

As described above, the first facesheet 122A and the second facesheet 122B are fully cured in advance of applying the facesheets onto the contoured composite structure 130. The first facesheet 122A and the second facesheet 122B can be cured using any of various techniques at the same location as that of the repair of the contoured composite structure 130, or a remote location. Because the facesheets are cured before application onto the contoured composite structure 130 and at a location away from the contoured composite structure 130, the facesheets can be cured at any of various curing temperatures for any amount of time, even those that may otherwise be destructive to the contoured composite structure 130. Moreover, the curing of the facesheets being performed in advance of the repair of the contoured composite structure 130 means the fabrication of the facesheets will not delay the repair process. The layup and curing of the first facesheet 122A and the second facesheet 122B can be done on a planar tooling surface, which simplifies the curing process. In certain examples, the first facesheet 122A and the second facesheet 122B can be cut from a larger sheet of 2-ply cured fiber-reinforcement polymer material.

Figure 5:
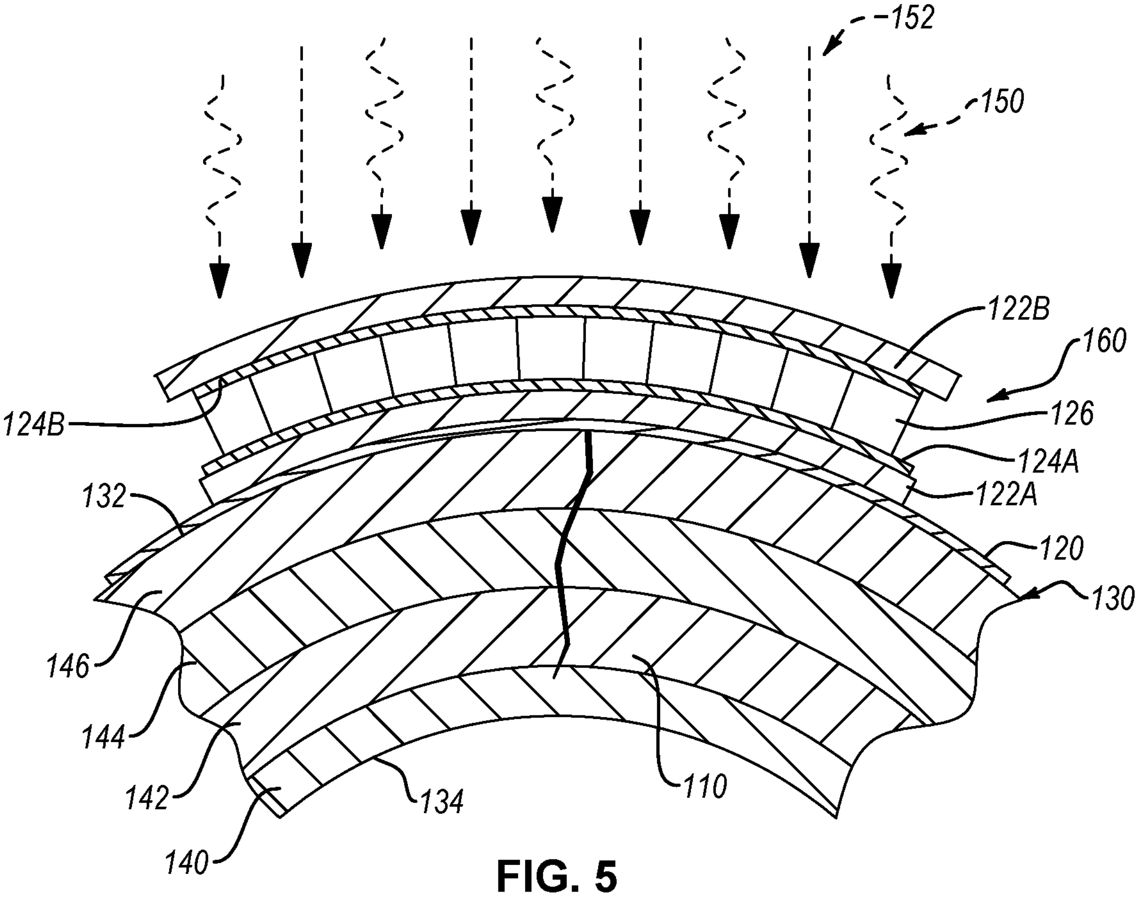
FIG. 5 is a cross-sectional side view of the contoured composite panel of FIG. 4, shown with the first facesheet, the second facesheet, and the core layer going through a cure process, according to one or more examples of the present disclosure.

According to some examples, as shown in FIG. 5, the first facesheet 122A and the second facesheet 122B are adhered to the core layer 126 by applying a first adhesive 124A between the first facesheet 122A and the core layer 126, applying a second adhesive 124B between the second facesheet 122B and the core layer 126, and at least partially curing the first adhesive 124A and the second adhesive 124B. The first adhesive 124A and the second adhesive 124B are curable adhesives that partially cure at some given partial-cure temperature and fully cure at a higher full-cure temperature. The partial-cure temperature, and the full-cure temperature in some examples, of the first adhesive 124A and the second adhesive 124B are significantly lower than any temperature that may damage the contoured composite structure 130. Accordingly, the first adhesive 124A and the second adhesive 124B can be partially or fully cured on the contoured composite structure 130 without damaging the contoured composite structure 130. Additionally, it is recognized that in some examples, the first adhesive 124A and the second adhesive 124B are cured at the same time. However, in other examples, the first adhesive 124A can be cured before the second adhesive 124B is cured, such that the first adhesive 124A can be cured before the second facesheet 122B is adhered to the core layer 126 (e.g., before the second facesheet 122B is even applied onto the core layer 126).

The first adhesive 124A and the second adhesive 124B can be the same type of adhesive or different types of adhesive. In certain examples, the first adhesive 124A and the second adhesive 124B are thermoset adhesives. Each one of the first adhesive 124A and the second adhesive 124B can be a paste adhesive that can be partially or fully cured at room temperature, in one instance, or at a temperature no higher than 160° F., in another instance. When the partial or full cure temperature is greater than room temperature, as shown in FIG. 5, heat 150 can be applied to the adhesives to increase the temperatures of the adhesives to at least the partial or full cure temperature. The heat 150 can be applied in any of various ways such as heating devices (e.g., heating blankets) or by placing the contoured composite structure 130 and components of the repair tool 160 in an autoclave or heated room. If pressure is required to partially or fully cure the adhesives, pressure 152 can be applied to the components of the repair tool 160, such as via a vacuum bag, clamps, weights, and/or the like. Once cured, the first adhesive 124A and the second adhesive 124B can withstand temperatures much higher than the cure temperature, such as temperatures associated with the curing of the uncured repair structure 170, as described below.

The first adhesive 124A can be applied between the first facesheet 122A and the core layer 126, and the second adhesive 124B can be applied between the second facesheet 122B and the core layer 126, in various ways. As shown in FIG. 4, the first adhesive 124A can be applied to the first facesheet 122A before the core layer 126 is applied to the first facesheet 122A. Similarly, as also shown in FIG. 4, the second adhesive 124B can be applied to the second facesheet 122B before the second facesheet 122B is applied to the core layer 126. However, in other examples, the first adhesive 124A and the second adhesive 124B can be alternatively, or additionally, applied onto the core layer 126 before the core layer 126 is applied to the first facesheet 122A and before the second facesheet 122B is applied to the core layer 126, respectively.

Figure 6:
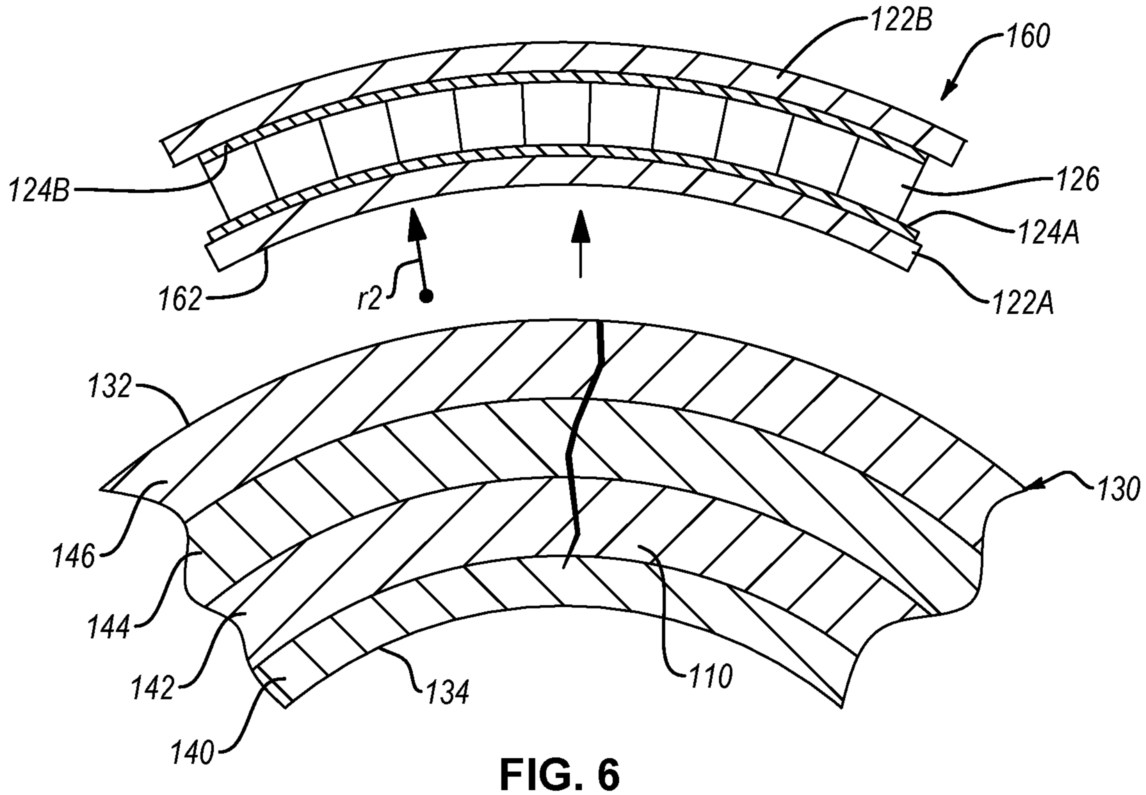
FIG. 6 is a cross-sectional side view of a repair tool being removed from the contoured composite structure of FIG. 5, according to one or more examples of the present disclosure.

Referring to FIGS. 6 and 12, after the first facesheet 122A and the second facesheet 122B are adhered to the core layer 126 (e.g., by at least partially curing adhesives therebetween as described above) and the repair tool 160 is formed on the contoured composite structure 130, the method 200 further includes (block 208) removing the repair tool 160 from the contoured surface 132 of the contoured composite structure 130. If the first stick-resistant sheet 120 is used, it can be removed as well.

As shown in FIG. 6, the repair tool 160 includes a structure interface surface 162 that has the same contour as the contoured surface 132. For example, in the illustrated example, a radius of curvature r2 of the structure interface surface 162 is equal to the radius of curvature r1 of the contoured surface 132. The structure interface surface 162 is the innermost surface of the repair tool 160 or the exposed surface of the first facesheet 122A.

Figure 9:
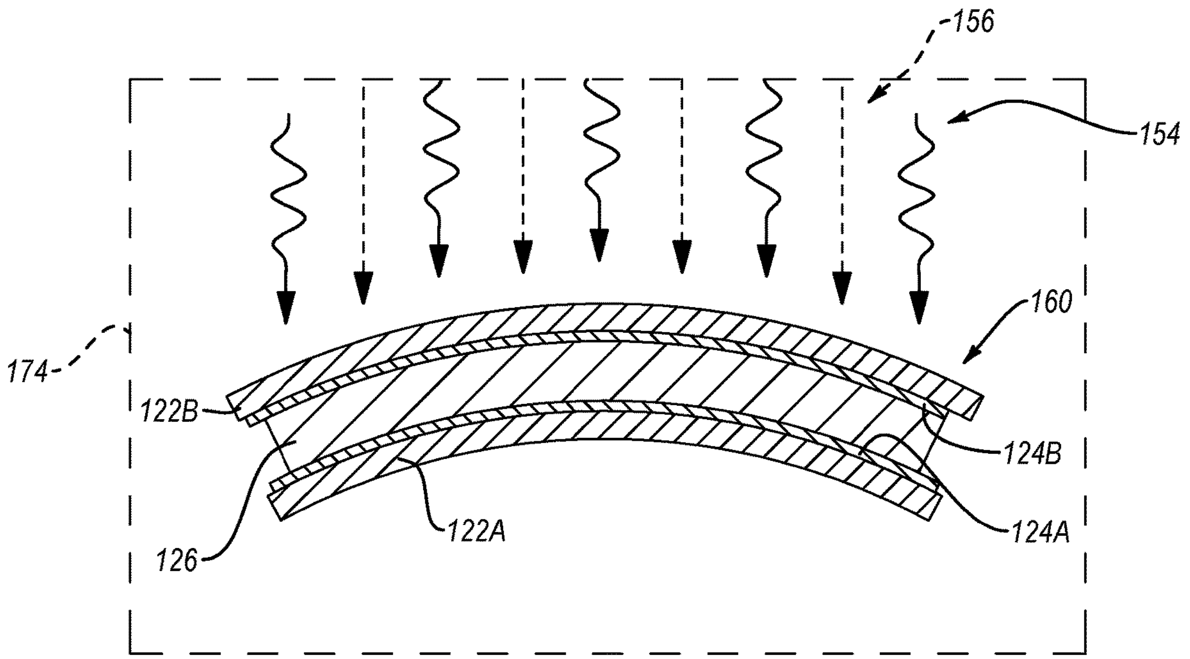
FIG. 9 is a cross-sectional side view of the repair tool of FIG. 6, shown going through a second curing process, according to one or more examples of the present disclosure.

In those examples where the first adhesive 124A and the second adhesive 124B are only partially cured on the contoured composite structure 130, the adhesives can be fully cured after the repair tool 160 is removed from the contoured composite structure 130. For example, as shown in FIG. 9, with the repair tool 160 removed from the contoured composite structure 130, heat 154 and/or pressure 156 can be applied to the repair tool 160 to heat the adhesives to a full cure temperature that is greater than the partial cure temperature. The heat 154 and/or pressure 156 are applied at a location remote from the contoured composite structure 130. Accordingly, the repair tool 160 can be heated to temperatures higher than those that could damage the contoured composite structure 130. In some examples, the heat 154 and the pressure 156 are applied to the repair tool 160 in an autoclave 174. The pressure 156 can be applied via a vacuum bag or other technique. It is noted that a partial cure of the first adhesive 124A and the second adhesive 124B on the contoured composite structure 130 sufficiently stiffens the adhesive such that the repair tool 160, when removed from the contoured composite structure 130, retains the shape it had on the contoured composite structure 130. The full cure of the adhesives, away from the contoured composite structure 130, merely strengthens and further stiffens the adhesives in preparation for the heat and pressure associated with the replacement process, for replacing the structural abnormality 110 in the contoured composite structure 130, as described in more detail below.

Figure 7:
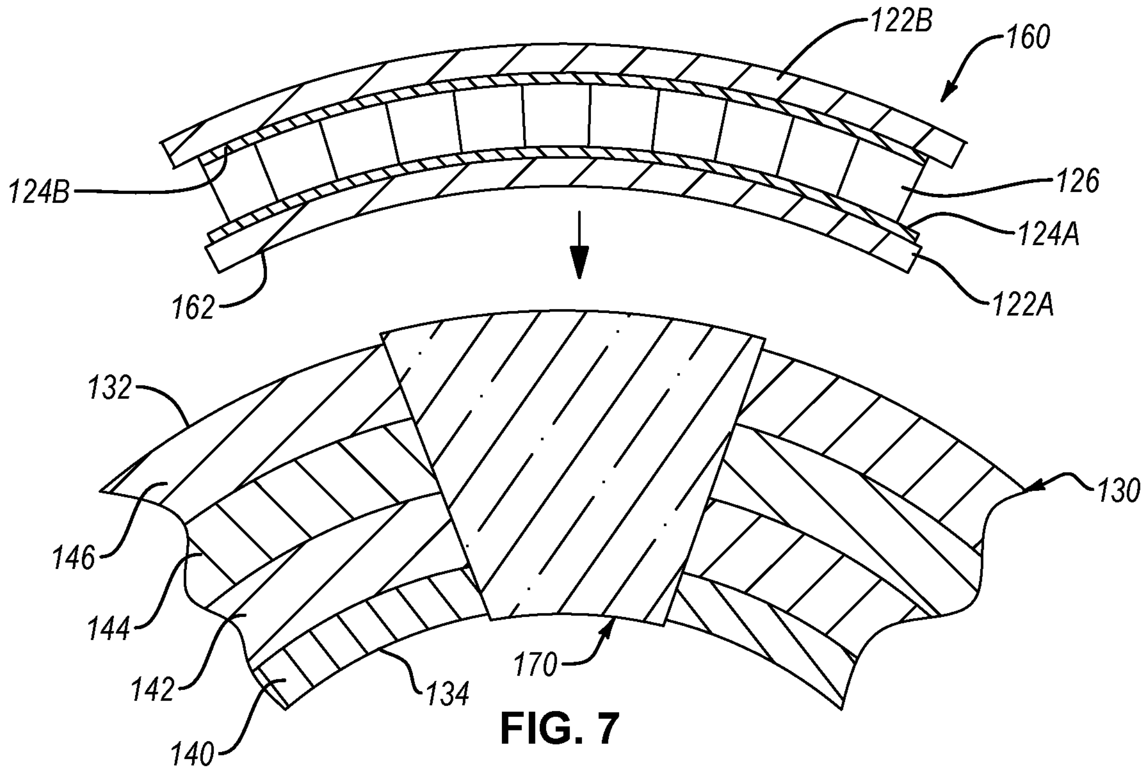
FIG. 7 is a cross-sectional side view of the contoured composite structure of FIG. 6, shown with an uncured repair structure in place of the structural abnormality and the repair tool being applied onto the contoured surface of the contoured composite structure over the uncured repair structure, according to one or more examples of the present disclosure.

With the repair tool 160 removed from the contoured composite structure 130, and referring to FIGS. 7 and 12, the method 200 includes (block 210) replacing the structural abnormality 110 of the contoured composite structure 130 with an uncured repair structure 170. Replacing the structural abnormality 110 with the uncured repair structure 170 includes removing a portion of the contoured composite structure 130 that contains the structural abnormality 110. In some examples, the portion of the contoured composite structure 130 can be removed by any of various removal techniques, such as cutting, etching, grinding, and the like. With the portion removed, a void is formed in the contoured composite structure 130. The void is filled, at least partially, by the uncured repair structure 170. In some examples, the uncured repair structure 170 is a repair patch, which can be pre-made and inserted into the void. According to other examples, the uncured repair structure 170 includes dispensing an uncured polymer material into the void. Regardless of the type of uncured repaired structure used, it is made at least partially from an uncured, yet curable, material, such as a thermoset epoxy or resin. The uncured curable material of the uncured repair structure 170 cures at a given cure temperature associated with the material. The cure temperature of the curable material of the uncured repair structure 170 is higher than the partial cure temperature of the first adhesive 124A and the second adhesive 124B. According to one example, the cure temperature of the curable material of the uncured repair structure 170 is between, and inclusive, of 1.1 and 3.0 times (e.g., 1.8 times) higher than the partial cure temperature of the first adhesive 124A and the second adhesive 124B. For example, the cure temperature of the uncured repair structure 170 can be upwards of 325° F. and the partial cure temperature of the adhesives can be as low as 180° F.

Figure 8:
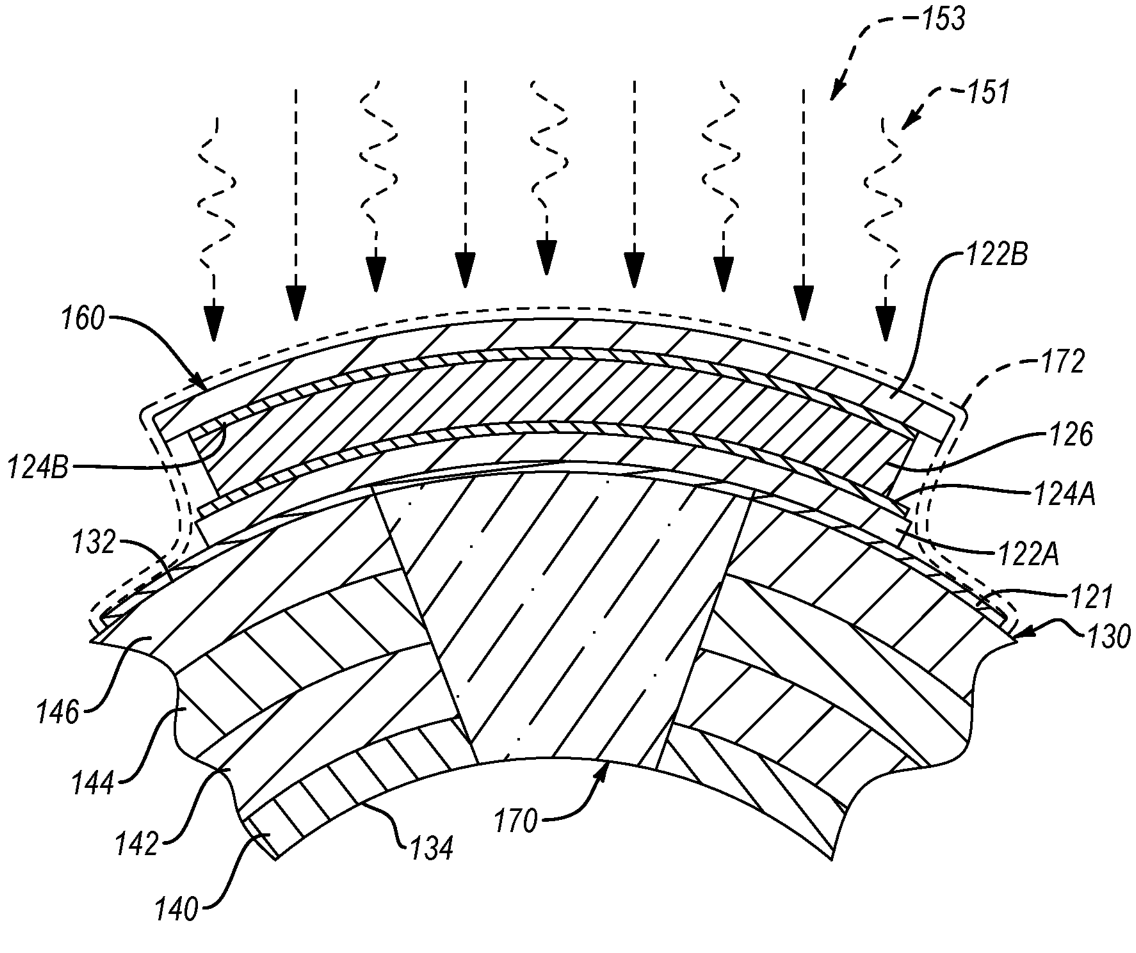
FIG. 8 is a cross-sectional side view of the contoured composite structure of FIG. 7, shown with the uncured repair structure going through a curing process, according to one or more examples of the present disclosure.

After the uncured repair structure 170 has replaced the structural abnormality 110, and referring to FIGS. 7, 8, and 12, the method 200 further includes (block 212) reapplying the repair tool 160 onto the contoured surface 132, in the same location associated with the formation of the repair tool 160. In this location, the repair tool 160 overlays the uncured repair structure 170. Moreover, reapplying the repair tool 160 includes reengaging, in a nested engagement, the structure interface surface 162 of the repair tool 160 with the contoured surface 132. In certain examples, as shown in FIG. 8, before reapplying the repair tool 160 onto the contoured surface 132, the method includes applying a second stick-resistant sheet 121 onto the contoured surface 132 such that the second stick-resistant sheet 121 is interposed between the repair tool 160 and the contoured surface 132. The second stick-resistant sheet 12 can be the same type as the first stick-resistant sheet 120, or can be a different type, such as a type configured to withstand higher temperatures than the first stick-resistant sheet 120.

After the repair tool 160 is reapplied onto the contoured surface 132 over the uncured repair structure 170, and referring to FIGS. 8 and 12, the method 200 further includes (block 214) curing the uncured repair structure 170. In some examples, curing the uncured repair structure 170 includes heating the uncured repair structure 170 to a temperature at or above the cure temperature of the uncured repair structure 170. Heat 151 can be applied in any of various ways, such as described above. Curing the uncured repair structure 170 can also include applying pressure 153 to the uncured repair structure 170 as the uncured repair structure 170 is heated. In some examples, the pressure is applied by creating a negative pressure environment within a vacuum bag 172, which envelops the uncured repair structure 170 and the repair tool 160 and seals against the contoured composite structure 130. After the uncured repair structure 170 is cured, the method includes removing the repair tool 160, and the second stick-resistant sheet 121 if used, from the contoured composite structure 130. After the repair tool 160 is removed from the contoured composite structure 130, and after any post-curing processing of the contoured composite structure 130, repair of the contoured composite structure 130 is complete.

Figure 11:
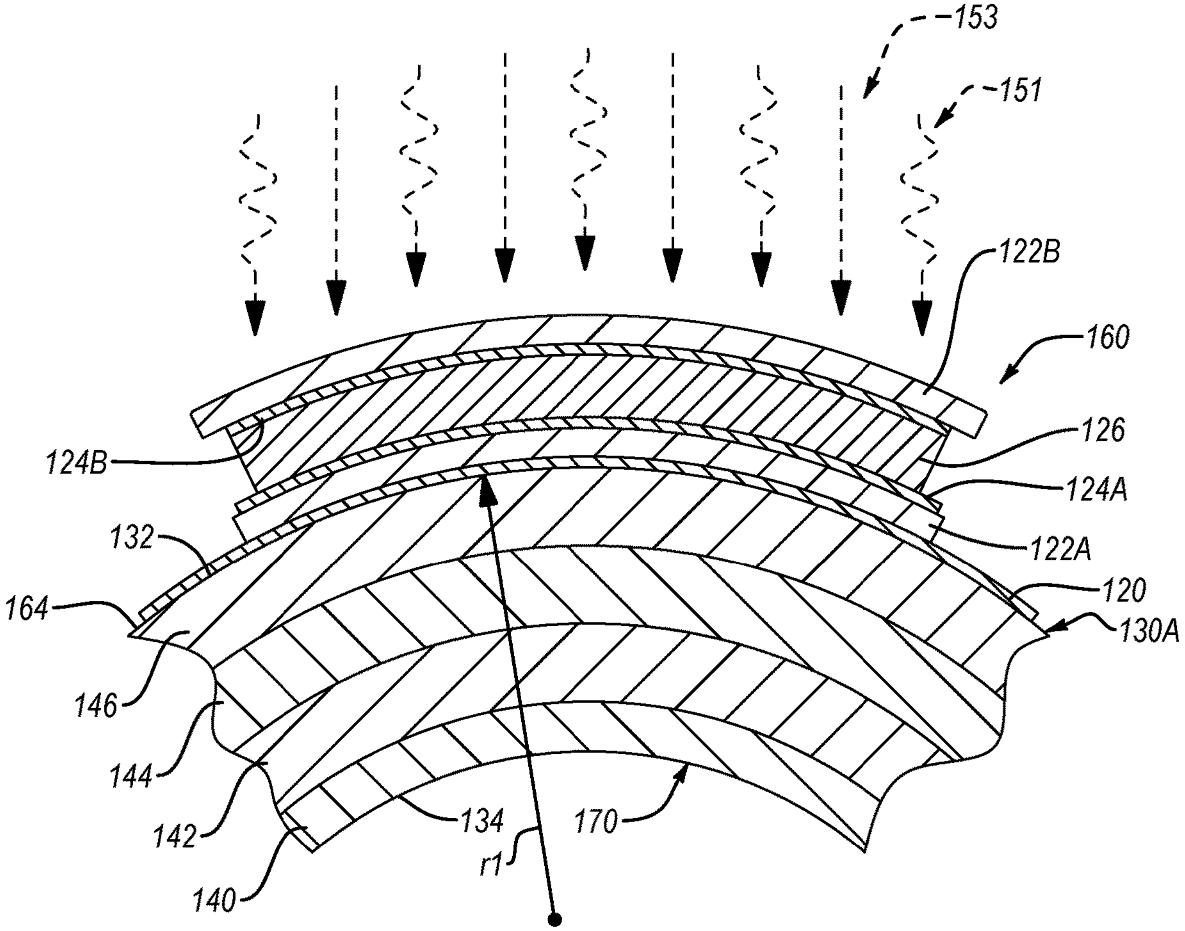
FIG. 11 is a cross-sectional side view of a repair tool, shown being formed on a normal contoured surface of a normal contoured composite structure, according to one or more examples of the present disclosure.
Figure 13:
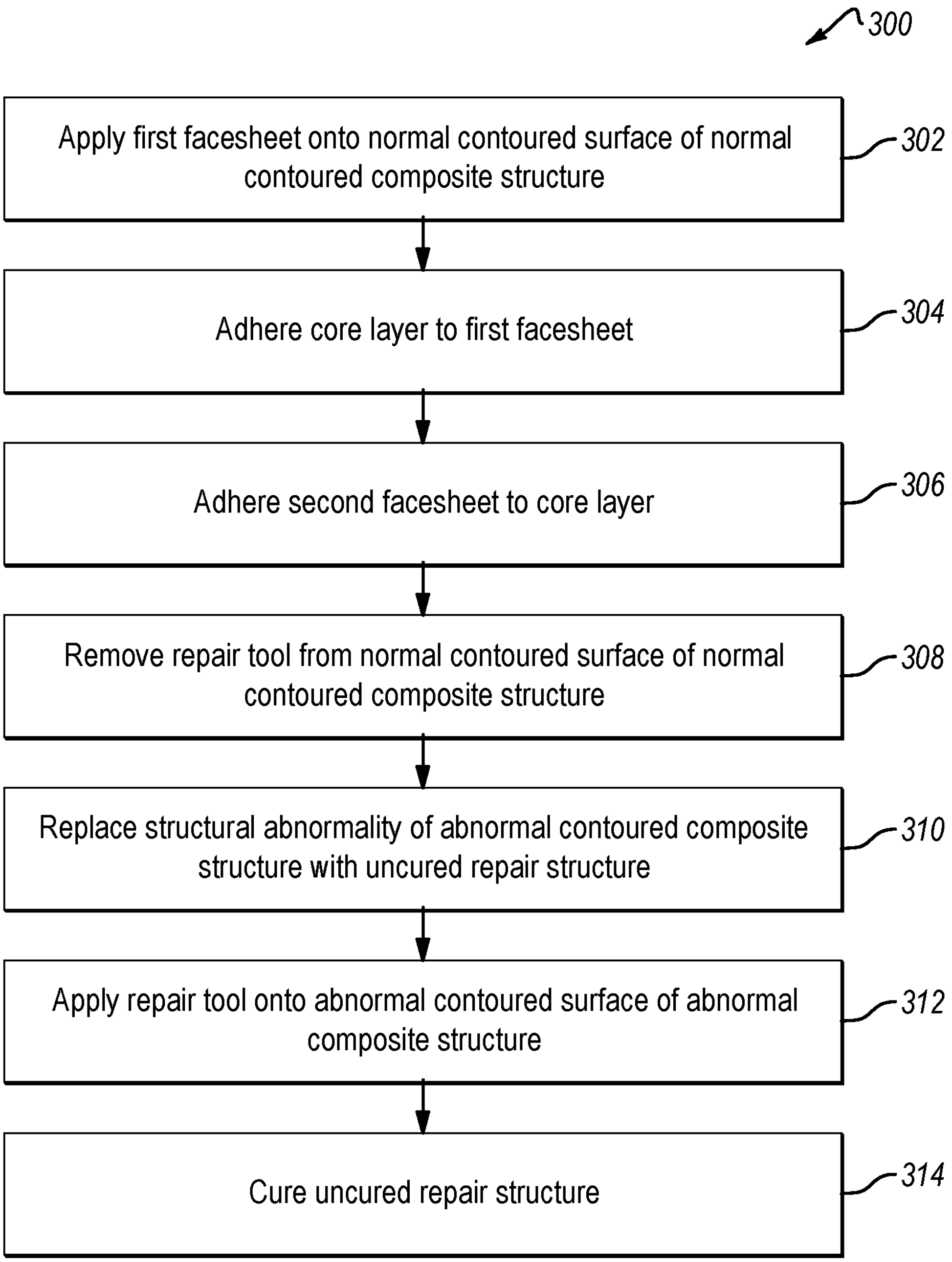
FIG. 13 is a schematic flow chart of a second method of repairing a contoured composite structure, according to one or more examples of the present disclosure.

According to a second example, and referring to FIG. 13, a method 300 of repairing the contoured composite structure 130 is shown. Like the method 200, the method 300 includes the formation of the repair tool 160 that helps to support the contoured composite structure 130, thus preserving the initial contour of the contoured composite structure 130, when the repair structure is cured. Accordingly, the method 300 is similar to the method 200. However, unlike the method 200, in the method 300, instead of being formed on the contoured composite structure 130 that has the structural abnormality 110, the repair tool 160 is formed on a separate contoured composite structure 130A that has a contour that matches the contoured composite structure 130 but does not have a structural abnormality (hence being alternatively termed a normal contoured composite structure having a normal contoured surface). More specifically, referring to FIGS. 11 and 13 the method 300 includes (block 302) applying the first facesheet 122A onto a normal contoured surface 164 of a normal contoured composite structure 130A such that the first facesheet 122A overlays and conforms to the shape of the normal contoured surface 164. The shape of the normal contoured surface 164 matches the shape of the contoured surface 132 of the contoured composite structure 130 having the structural abnormality 110. Because the contoured composite structure 130 has the structural abnormality 110, the contoured composite structure 130 can be referred to herein as an abnormal contoured composite structure and the contoured surface 132 can be referred to herein as an abnormal contoured surface.

Like the method 200, the method 300 further includes (block 304) adhering the core layer 126 to the first facesheet 122A and (block 306) adhering the second facesheet 122B to the core layer 126 such that the core layer 126 is sandwiched between the first facesheet 122A and the second facesheet 122B. Instead of removing the repair tool 160 from the contoured composite structure 130, like with the method 200, the method 300 instead includes (block 308) removing the repair tool 160 from the normal contoured surface 164 of the normal contoured composite structure 130A. The method 300 further includes (block 310) replacing the structural abnormality 110 of the abnormal contoured composite structure 130 with an uncured repair structure 170, (block 312) applying the repair tool 160 onto the abnormal contoured surface 132 of the abnormal contoured composite structure 130, and (block 314) curing the uncured repair structure 170, which are effectively the same as the steps of block 210, block 212, and block 214 of the method 200. The method 300 is effective when a contoured composite part matching the contoured composite part with the structural abnormality is available and in a location proximate the repair location.

Figure 14:
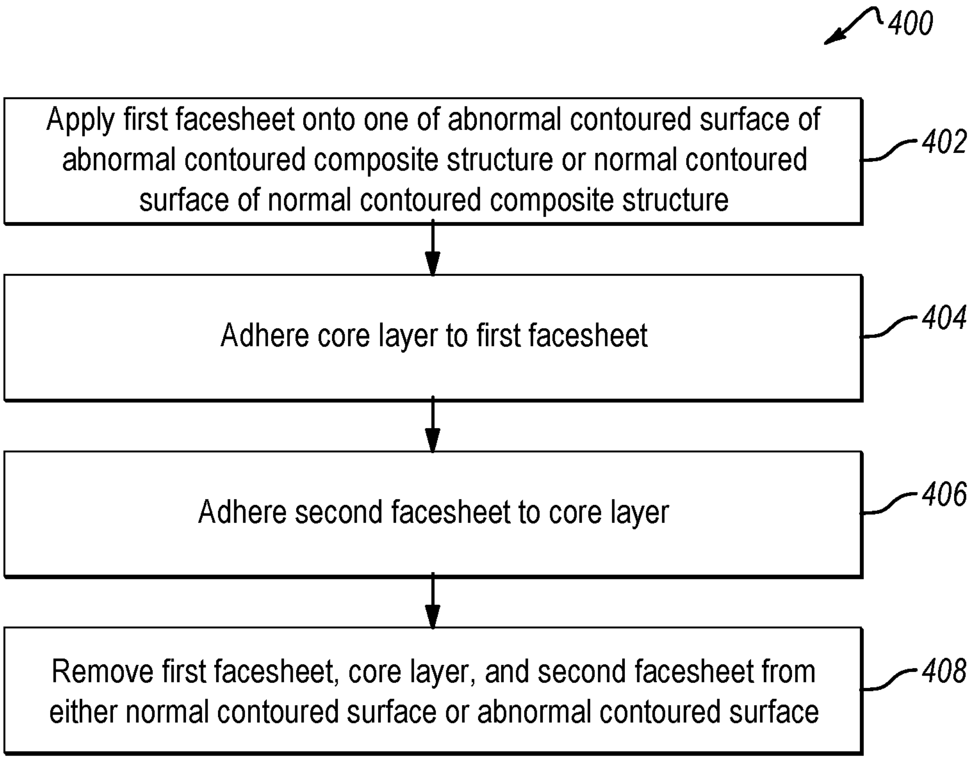
FIG. 14 is a schematic flow chart of a method of forming a repair tool, according to one or more examples of the present disclosure.

Referring to FIG. 14, in one example, a method 400 of forming the repair tool 160 is shown. The method 400 includes the steps of block 402, block 404, block 406, and block 408, which correspond with the steps of block 202, the block 204, the block 206, and the block 208, respectively, of the method 200, or corresponds with the steps of block 302, the block 304, the block 306, and the block 308, respectively, of the method 300. In other words, in some examples, the method 400 forms a repair tool 160 in the same manner as the method 200 or the method 300, but the method 400 does not include the repair steps of the method 200 or the method 300. Accordingly, the method 400 can be practiced to make a repair tool 160 that can be used later, such as at a different repair facility or by different repair personnel, to repair a contoured composite structure. Accordingly, in some examples, repair tools 160 can be formed and stored, and then used in a future repair process when a repair is needed.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method of repairing a contoured composite structure made of fiber-reinforced polymer plies, the method comprising:

applying a first facesheet, made of a first cured material, onto a contoured surface of the contoured composite structure such that the first facesheet overlays a structural abnormality of the contoured composite structure and conforms to the shape of the contoured surface;

adhering a core layer, made of a lightweight core material, to the first facesheet such that the core layer overlays the structural abnormality of the contoured composite structure and conforms to the shape of the contoured surface;

adhering a second facesheet, made of a second cured material, to the core layer such that the core layer is sandwiched between the first facesheet and the second facesheet, the second facesheet overlays the structural abnormality of the contoured composite structure, and the second facesheet conforms to the shape of the contoured surface, wherein the core layer comprises a cellular structure including a plurality of cells, and wherein the first facesheet, the core layer, and the second facesheet form a repair tool;

removing the repair tool from the contoured surface of the contoured composite structure;

after removing the repair tool from the contoured surface of the contoured composite structure, replacing the structural abnormality of the contoured composite structure with an uncured repair structure;

reapplying the repair tool onto the contoured surface such that the repair tool overlays the uncured repair structure; and when the repair tool is reapplied onto the contoured surface over the uncured repair structure, curing the uncured repair structure.

2. The method according to claim 1, wherein adhering the core layer to the first facesheet comprises:

applying a first adhesive between the first facesheet and the core layer; and at least partially curing the first adhesive.

3. The method according to claim 2, wherein adhering the second facesheet to the core layer comprises:

applying a second adhesive between the second facesheet and the core layer; and at least partially curing the second adhesive.

4. The method according to claim 3, wherein:

the first adhesive and the second adhesive are at least partially cured at a first cure temperature;

the uncured repair structure is cured at a second cure temperature; and the second cure temperature is greater than the first cure temperature.

5. The method according to claim 4, wherein the second cure temperature is at least 1.8 times higher than the first cure temperature.

6. The method according to claim 4, wherein:

the first adhesive and the second adhesive are partially cured at the first cure temperature; and the method further comprises, after removing the repair tool from the contoured surface and before reapplying the repair tool onto the contoured surface, fully curing the first adhesive and the second adhesive at a third cure temperature greater than the first cure temperature.

7. The method according to claim 1, wherein each one of the first facesheet and the second facesheet comprises no more than two plies of the first cured material and the second cured material, respectively.

8. The method according to claim 1, further comprising:

before applying the first facesheet onto the contoured surface, applying a first stick-resistant sheet onto the contoured surface such that the first stick-resistant sheet is interposed between the first facesheet and the contoured surface;

removing the first stick-resistant sheet from the contoured surface after removing the repair tool from the contoured surface; and before reapplying the repair tool onto the contoured surface, applying a second stick-resistant sheet onto the contoured surface such that the second stick-resistant sheet is interposed between the repair tool and the contoured surface.

9. The method according to claim 1, wherein the core layer comprises at least one of a honeycomb core or a cellular polymer core.

10. A method of repairing an abnormal contoured composite structure made of fiber-reinforced polymer plies, the method comprising:

applying a first facesheet, made of a first cured material, onto a normal contoured surface of a normal contoured composite structure such that the first facesheet overlays and conforms to the shape of the normal contoured surface, wherein the shape of the normal contoured surface matches the shape of an abnormal contoured surface of the abnormal contoured composite structure, and wherein a structural abnormality of the abnormal contoured composite structure is formed in or under the abnormal contoured surface;

adhering a core layer, made of a lightweight core material, to the first facesheet such that the core layer overlays the normal contoured surface of the normal contoured composite structure and conforms to the shape of the normal contoured surface;

adhering a second facesheet, made of a second cured material, to the core layer such that the core layer is sandwiched between the first facesheet and the second facesheet, the second facesheet overlays the normal contoured surface, and the second facesheet conforms to the shape of the normal contoured surface, wherein the core layer comprises a cellular structure including a plurality of cells, and wherein the first facesheet, the core layer, and the second facesheet form a repair tool;

removing the repair tool from the normal contoured surface of the normal contoured composite structure;

replacing the structural abnormality of the abnormal contoured composite structure with an uncured repair structure;

applying the repair tool onto the abnormal contoured surface of the abnormal contoured composite structure such that the repair tool overlays the uncured repair structure; and when the repair tool is applied onto the abnormal contoured surface over the uncured repair structure, curing the uncured repair structure.

11. The method according to claim 10, wherein adhering the core layer to the first facesheet comprises:

applying a first adhesive between the first facesheet and the core layer; and at least partially curing the first adhesive.

12. The method according to claim 11, wherein adhering the second facesheet to the core layer comprises:

applying a second adhesive between the second facesheet and the core layer; and at least partially curing the second adhesive.

13. The method according to claim 12, wherein:

the first adhesive and the second adhesive are at least partially cured at a first cure temperature;

the uncured repair structure is cured at a second cure temperature; and the second cure temperature is greater than the first cure temperature.

14. The method according to claim 13, wherein the second cure temperature is at least 1.8 times higher than the first cure temperature.

15. The method according to claim 13, wherein:

the first adhesive and the second adhesive are partially cured at the first cure temperature; and the method further comprises, after removing the repair tool from the normal contoured surface and before applying the repair tool onto the contoured surface of the contoured composite structure, fully curing the first adhesive and the second adhesive at a third cure temperature greater than the first cure temperature.

16. The method according to claim 10, wherein each one of the first facesheet and the second facesheet comprises no more than two plies of the first cured material and the second cured material, respectively.

17. The method according to claim 10, further comprising:

before applying the first facesheet onto the normal contoured surface, applying a first stick-resistant sheet onto the normal contoured surface such that the first stick-resistant sheet is interposed between the first facesheet and the normal contoured surface; and before applying the repair tool onto the contoured surface of the contoured composite structure, applying a second stick-resistant sheet onto the contoured surface such that the second stick-resistant sheet is interposed between the repair tool and the contoured surface.

18. The method according to claim 10, wherein curing the uncured repair structure comprises applying pressure to the repair tool and the uncured repair structure and, when applying the pressure, heating the uncured repair structure.

19. A method of forming a repair tool for repairing an abnormal contoured composite structure made of fiber-reinforced polymer plies, the method comprising:

applying a first facesheet, made of a first cured material, onto one of:

an abnormal contoured surface of the abnormal contoured composite structure such that the first facesheet overlays a structural abnormality of the abnormal contoured composite structure and conforms to the shape of the abnormal contoured surface; or a normal contoured surface of a normal contoured composite structure such that the first facesheet overlays and conforms to the shape of the normal contoured surface, wherein the shape of the normal contoured surface matches the shape of the abnormal contoured surface of the abnormal contoured composite structure, and wherein the structural abnormality of the abnormal contoured composite structure is formed in or under the abnormal contoured surface adhering a core layer, made of a lightweight core material, to the first facesheet such that the core layer conforms to the shape of the first facesheet;

adhering a second facesheet, made of a second cured material, to the core layer such that the core layer is sandwiched between the first facesheet and the second facesheet, and the second facesheet conforms to the shape of the core layer, wherein the core layer comprises a cellular structure including a plurality of cells; and removing the first facesheet, the core layer, and the second facesheet from either the abnormal contoured surface of the abnormal contoured composite structure or the normal contoured surface of the normal contoured composite structure.

20. The method according to claim 19, wherein:

adhering the core layer to the first facesheet comprises:

applying a first adhesive between the first facesheet and the core layer; and at least partially curing the first adhesive; and adhering the second facesheet to the core layer comprises:

applying a second adhesive between the second facesheet and the core layer; and at least partially curing the second adhesive.

* * * * *